US007611083B2

(12) United States Patent
Zhang

(10) Patent No.: US 7,611,083 B2
(45) Date of Patent: Nov. 3, 2009

(54) SAFETY DEVICE FOR FEEDER OF SHREDDER

(76) Inventor: Jian Zhang, 1-11D, Siangjing Building, Futian District, Shenzhen, Guangdong Province (CN)

( * ) Notice: Subject to any disclaimer, the term of this patent is extended or adjusted under 35 U.S.C. 154(b) by 119 days.

(21) Appl. No.: 11/709,894

(22) Filed: Feb. 23, 2007

(65) Prior Publication Data

US 2008/0006728 A1 Jan. 10, 2008

(30) Foreign Application Priority Data

Jun. 6, 2006 (CN) ........................ 2006 1 0060917

(51) Int. Cl.
*B02C 23/00* (2006.01)
*A01F 21/00* (2006.01)

(52) U.S. Cl. ........................ 241/37.5; 241/100; 241/236

(58) Field of Classification Search ................. 241/100, 241/236, 295, 37.5
See application file for complete search history.

(56) References Cited

U.S. PATENT DOCUMENTS 6,460,790 B1 * 10/2002 Wu Huang .................. 241/100
7,398,936 B1 * 7/2008 Wang ......................... 241/100
2007/0012808 A1 * 1/2007 Kao .......................... 241/37.5
2007/0241220 A1 * 10/2007 Marbourg ................... 241/100
2008/0093488 A1 * 4/2008 Kent et al. .................. 241/100
2008/0128537 A1 * 6/2008 Huang ....................... 241/37.5
2008/0156911 A1 * 7/2008 Huang ....................... 241/37.5
2008/0156912 A1 * 7/2008 Huang ....................... 241/37.5
2008/0169369 A1 * 7/2008 Wang ......................... 241/37.5

* cited by examiner

*Primary Examiner*—Faye Francis

(57) ABSTRACT

A shredder feeder includes a pair of rotary blade rollers, an insertion assembly including an insertion slot, a spring biased raised safety panel enclosing the insertion slot, a safety switch, an emergency indicator, and a feeding and removal selection switch. In one operation in response to winding an object other than documents, CDs, and credit cards into the insertion slot or clogging, pressing the safety panel will switch the feeding and removal selection to a removal mode for removing the object, and disable the blade rollers in response to the removal. Alternatively, pressing the safety panel will switch the safety switch to disable the blade rollers and enable the emergency indicator for informing a user to switch the feeding and removal selection switch to the removal mode. Further, pressing the safety panel will disable the blade rollers in response to no object in the insertion slot.

6 Claims, 2 Drawing Sheets

SAFETY DEVICE FOR FEEDER OF SHREDDER

BACKGROUND OF THE INVENTION

1. Field of Invention

The invention relates to feeding system of shredder and more particularly to an improved safety device for a feeder of a shredder (e.g., one for shredding documents, CDs, credit cards, or the like).

2. Description of Related Art

Conventionally, there are two types of shredder for shredding documents, CDs, credit cards, or the like. One type of shredder operates as follows. The shredding cutters rotate when the shredder is turned on. An operator has to turn off the switch when clogging occurs. Thereafter, a removal of the fed material is made possible. However, it is often that an operator forcedly removes the fed material out of the insertion slot once the clogging occurs without turning off the switch first. As a result, the hand may be cut by the rotating cutters or hurt otherwise. The other type of shredder is equipped with a sensor proximate the insertion slot. The cutters begin to rotate only after the material has inserted into the insertion slot with the sensor being enabled. The cutters are deactivated by a stop signal sent from the sensor in response to clogging. At the same time, a material removal signal is sent from the sensor to a microcontroller for automatically changing the shredder to a material removal mode. The sensor can be implemented as either an electronic sensor which is very high in price or an arm which is susceptible to being broken during operation.

Moreover, both types of shredder are prone to winding personal articles (e.g., tie, necklace, or the like) worn on the operator or even the hair into the insertion slot if sufficient care is not taken during operation. Thus, the need for improvement still exists.

In addition, WO 2006/031324 A1 entitled "Shredder Throat Safety System" is believed to be related to the present invention.

SUMMARY OF THE INVENTION

It is therefore one object of the invention to provide a feeding system of a shredder including a housing, a pair of rotary blade rollers in the housing, a safety switch on the housing, and a shred reservoir under the blade rollers, comprising an insertion slot on the housing and aligned with the blade rollers; a raised safety panel enclosing the insertion slot and above the safety switch; two resilient members each biased between one side of the safety panel and the housing; an emergency indicator spaced from the safety panel; and a feeding and removal selection switch on the housing, whereby in response to either winding an object other than one of a plurality of materials including documents, CDs, and credit cards into the insertion slot or clogging, pressing the safety panel will switch the feeding and removal selection to a removal mode for removing the object, and disable the blade rollers in response to the removal.

It is another object of the invention to provide a feeding system of a shredder including a housing, a pair of rotary blade rollers in the housing, an safety switch on the housing, and a shred reservoir under the blade rollers, comprising an insertion assembly on the housing and aligned with the blade rollers, the insertion assembly including a first insertion slot for documents, a second insertion slot for credit cards, and a third insertion slot for CDs; a raised safety panel enclosing the insertion slot and above the safety switch; two resilient members each biased between one side of the safety panel and the housing; an emergency indicator spaced from the safety panel; and a feeding and removal selection switch on the housing, whereby in response to either winding an object other than one of a plurality of materials including documents, CDs, and credit cards into the insertion assembly or clogging, pressing the safety panel will switch the feeding and removal selection to a removal mode for removing the object, and disable the blade rollers in response to the removal.

In one aspect of the invention the resilient members are springs.

In another aspect of the invention the safety panel is adapted to press to switch the safety switch to an off state for disabling the blade rollers and enabling the emergency indicator for informing a user to switch the feeding and removal selection switch to the removal mode.

In a further aspect of the invention the safety panel is adapted to press to disable the blade rollers in response to no object in the insertion slot.

The above and other objects, features and advantages of the invention will become apparent from the following detailed description taken with the accompanying drawings.

DETAILED DESCRIPTION OF THE INVENTION

Figure 1:
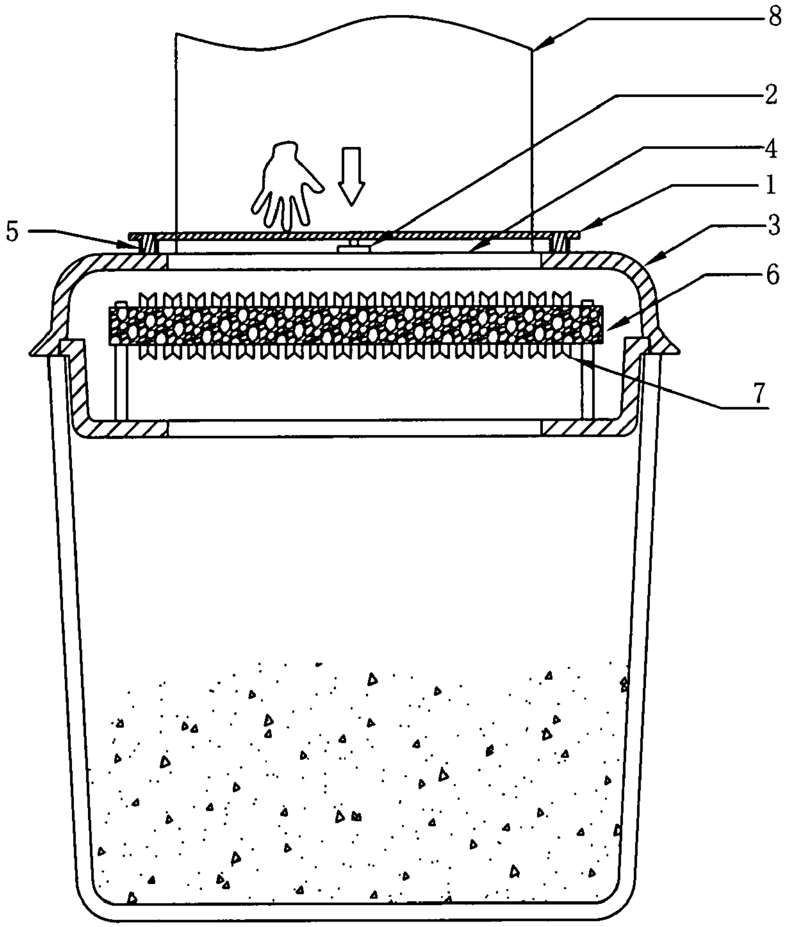
FIG. 1 is a sectional view of a shredder incorporating a first preferred embodiment of safety device for feeder according to the invention.
Figure 2:
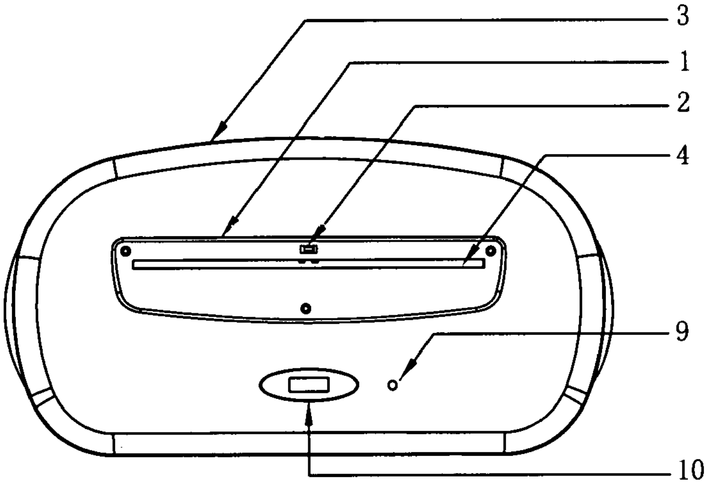
FIG. 2 is top plan view of the shredder of FIG. 1.

Referring to FIGS. 1 and 2, a safety device for feeder of shredder in accordance with a first preferred embodiment of the invention is shown.

On an upper portion of the shredder there are provided a top panel 3, an insertion slot 4 on a central portion of the top panel 3, a pair of rotary rollers 6 under the insertion slot 4 by a first predetermined distance, a plurality of blades 7 mounted on the rollers 6, a safety panel 1 mounted around and spaced from the insertion slot 4, the safety panel 1 being raised a small height for preventing undesired material from inadvertently inserting into the insertion slot 4, two springs 5 each biased between a portion of the safety panel 1 at one side and the top panel 3, a safety switch 2 proximate a center of the insertion slot 4 and under the safety panel 1 by a second predetermined distance, an emergency indicator 9 spaced from the safety panel 1, and a feeding and removal selection switch 10 proximate the emergency indicator 9.

In a normal operation, an operator may insert material (e.g., documents, CDs, credit cards, or the like) 8 into the insertion slot 4 after turning on the safety switch 2. Immediately, the material 8 is fed to the blades 7 for shredding into fine pieces.

In a case of an object other than the material 8 wound into the insertion slot 4, the operator may immediately press the safety panel 1 to contact and thus switch the safety switch 2 to an off state as well as enable a safety circuit (not shown). As an end, the rollers 6 stop rotation in real time. At the same time, the emergency indicator 9 flashes or light for informing the operator to switch the feeding and removal selection switch 10 (i.e., the shredder) to a removal mode by reversing a motor (not shown) if such needs arise. Thereafter, the operator may safely remove the undesired fed object from the insertion slot 4. An operation of removing clogged material is substantially the same as the operation discussed above.

Preferably, the safety switch 2 is implemented as an on/off switch (e.g., foil switch).

Figure 3:
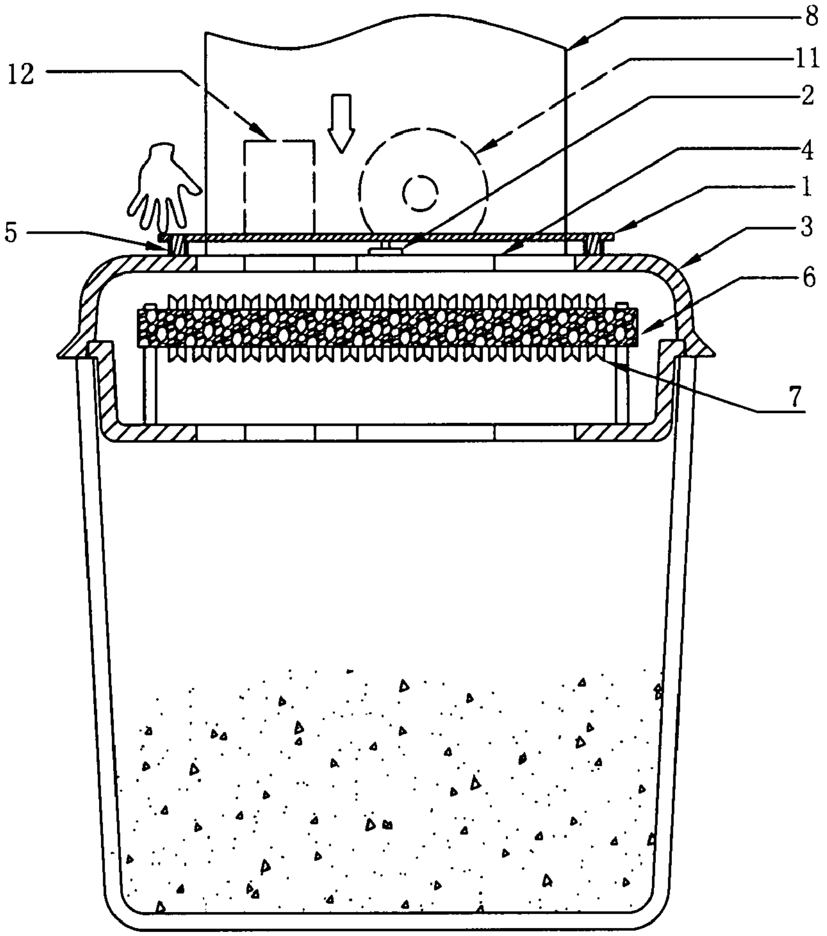
FIG. 3 is a sectional view of a shredder incorporating a second preferred embodiment of safety device for feeder according to the invention.
Figure 4:
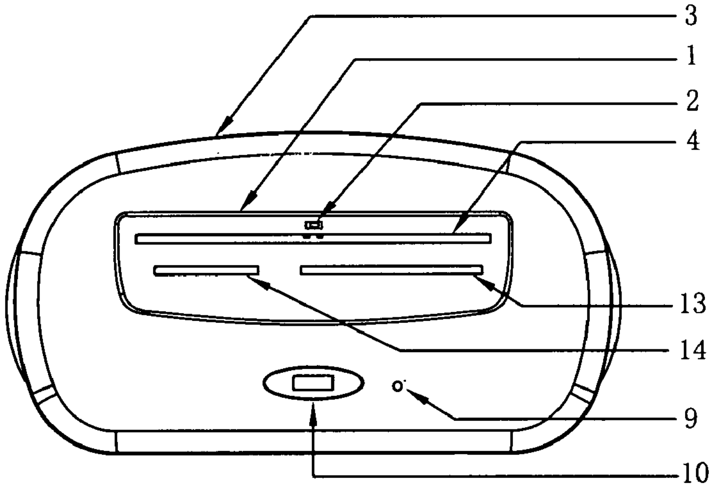
FIG. 4 is top plan view of the shredder of FIG. 3.

Referring to FIGS. 3 and 4, a safety device for feeder of shredder in accordance with a second preferred embodiment of the invention is shown. The second embodiment is identical to the first embodiment, except that a first insertion slot 13 for credit cards 12 and a second insertion slot 14 for CDs 11 are additionally provided besides the main insertion slot 4 for documents 8.

The emergency operation, the material feeding operation and the material removal operation of the shredder due to clogging are the same as that discussed in the first embodiment and a detailed description thereof is therefore deemed unnecessary.

Note that in either embodiment the shredder can be alternatively configured as below. In case of emergency (e.g., an object other than the material 8 wound into the insertion slot 4) after pressing the safety panel 1, the feeding and removal selection switch 10 is automatically enabled to switch the shredder to a removal mode by reversing the motor. Thus, the undesired fed object is successfully removed from the insertion slot 4. After the removal, the shredder is disabled automatically by turning off the safety switch 2 as a result of a subsequent step performed by the feeding and removal selection switch 10.

Note that the shredder stops immediately after pressing the safety panel 1 if there is no undesired object in the insertion slot 4. This is a safety arrangement since it is possible of inadvertently pressing the safety panel 1.

While the invention herein disclosed has been described by means of specific embodiments, numerous modifications and variations could be made thereto by those skilled in the art without departing from the scope and spirit of the invention set forth in the claims.

What is claimed is:

1. A feeding system of a shredder including a housing, a pair of rotary blade rollers in the housing, a safety switch on the housing, and a shred reservoir under the blade rollers, comprising:

an insertion slot on the housing and aligned with the blade rollers;

a raised safety panel enclosing the insertion slot and above the safety switch;

two resilient members each biased between one side of the safety panel and the housing;

an emergency indicator spaced from the safety panel; and a feeding and removal selection switch on the housing, whereby in response to either clogging or winding an object other than documents, CDs, and credit cards into the insertion slot, pressing the safety panel will switch the feeding and removal selection to a removal mode for removing the object, and disable the blade rollers in response to the removal.

2. The feeding system of claim 1, wherein the safety panel is adapted to press to switch the safety switch to an off state for disabling the blade rollers and enabling the emergency indicator for informing a user to switch the feeding and removal selection switch to the removal mode.

3. The feeding system of claim 1, wherein the safety panel is adapted to press to disable the blade rollers in response to no object in the insertion slot.

4. A feeding system of a shredder including a housing, a pair of rotary blade rollers in the housing, a safety switch on the housing, and a shred reservoir under the blade rollers, comprising:

an insertion assembly on the housing and aligned with the blade rollers, the insertion assembly including a first insertion slot for documents, a second insertion slot for credit cards, and a third insertion slot for CDs;

a raised safety panel enclosing the insertion slot and above the safety switch;

two resilient members each biased between one side of the safety panel and the housing;

an emergency indicator spaced from the safety panel; and a feeding and removal selection switch on the housing, whereby in response to either clogging or winding an object other than documents, CDs, and credit cards into the insertion assembly, pressing the safety panel will switch the feeding and removal selection to a removal mode for removing the object, and disable the blade rollers in response to the removal.

5. The feeding system of claim 4, wherein the safety panel is adapted to press to switch the safety switch to an off state for disabling the blade rollers and enabling the emergency indicator for informing a user to switch the feeding and removal selection switch to the removal mode.

6. The feeding system of claim 4, wherein the safety panel is adapted to press to disable the blade rollers in response to no object in the insertion slot.

* * * * *